United States Patent [19]

Shoji

[11] Patent Number: 5,007,776

[45] Date of Patent: Apr. 16, 1991

[54] CONTROLLER FOR BORING APPARATUS

[75] Inventor: Michihiro Shoji, Tokyo, Japan

[73] Assignee: Nitto Kohki Co., Ltd, Japan

[21] Appl. No.: 540,197

[22] Filed: Jun. 19, 1990

[30] Foreign Application Priority Data

Jun. 23, 1989 [JP] Japan .................... 1-73942[U]
Jun. 23, 1989 [JP] Japan .................... 1-73943[U]

[51] Int. Cl.⁵ .............................. B23B 45/14
[52] U.S. Cl. .......................... 408/6; 408/11;
  408/15; 408/16; 408/76
[58] Field of Search ........................ 408/5-16,
  408/76; 318/271, 280, 256, 257, 599, 602, 648;
  388/819, 811

[56] References Cited

U.S. PATENT DOCUMENTS 2,977,825 4/1961 Buck ........................ 408/76
4,559,577 12/1985 Shoji et al. ............... 408/6 X

FOREIGN PATENT DOCUMENTS 184614 11/1982 Japan ........................ 408/241 R Primary Examiner—Steven C. Bishop
Attorney, Agent, or Firm—Kinney & Lange

[57] ABSTRACT

A controller for a magnetic base drill unit provided with a safety circuit which is constructed by connecting in series a relay provided with contacts for cutting the power supply to the drill motor and feed motor, a resistor and a diode. The relay is actuated when a voltage higher than the predetermined voltage to be applied to the feed motor in the hole cutting mode is applied to the feed motor during the hole cutting, thereby cutting the power supply to the drill and feed motors. The controller has a means for confirming the operation of the safety circuit which apply a test voltage higher than the maximum predetermined voltage to be applied during the hole cutting to the feed motor in the fall mode of the electric drill.

13 Claims, 12 Drawing Sheets

FIG. 14

| NO. | OUTPUT FROM 525 | HOLE CUTTING | NODE S | NODE T | OUTPUT OF ||||
|---|---|---|---|---|---|---|---|---|
| | | | | | 605 | 606 | 607 | 608 |
| 1 | 0 | (INITIAL STATE) | 0 | 0 | 1 | 0 | 1 | 0 |
| 2 | 1 (RIGHT AFTER) | START | 0 | 0 | 1 | 0 | 1 | 0 |
| 3 | 1 (A LITTLE LATER) | GOING ON | 1 | 0 | 1 | 0 | 1 | 0 |
| 4 | 1 (FURTHER LATER) | GOING ON | 1 | 1 | 0 | 0 | 1 | 0 |
| 5 | 0 (RIGHT AFTER) | FINISH | 1 | 1 | 0 | 0 | 1 | 0 |
| 6 | 0 (A LITTLE LATER) | ——— | 0 | 1 | 0 | 1 | 0 | 1 |
| 7 | 0 (FURTHER LATER) | ——— | 0 | 0 | 1 | 0 | 0 | 1 |
| 8 | 0 (RIGHT AFTER) | FINISH | 1 | 0 | 1 | 0 | 1 | 0 |
| 9 | 0 (A LITTLE LATER) | ——— | 0 | 0 | 1 | 0 | 1 | 0 |

CONTROLLER FOR BORING APPARATUS

BACKGROUND OF THE INVENTION

1. Field of the Invention

The present invention relates to a controller for a magnetic base drill unit, and particularly to a controller for a magnet base drill unit wherein the feeding of a drill unit (an electric drill) is made by a feed motor, and the drill unit is restored to its initial position by causing the drill unit to rise at a high speed after the termination or completion of the outting by the drill.

2. Description of the Prior Art

Various kinds of magnetic base drill units have already been proposed, which comprise a drill unit provided with an annular hole cutter, a magnetic base for causing the drill unit to be magnetically adhered onto a workpiece for fixing, a feed motor for automatically feeding the drill unit to the workpiece, and the like. A magnetic base drill unit has also been proposed, wherein the drill unit is restored to its initial position after the hole cutting work by the drill unit is completed.

For instance, in the specification of U.S. Pat. No. 4,789,274 issued on Dec. 6, 1988 and assigned to the same assignee as the present invention, a technique is described for enhancing the efficiency of the hole cutting work by making the restoring (rise) speed of the drill unit after the termination of the hole cutting work faster than the feed (fall) speed of the drill unit during the hole cutting work. Specifically, in the magnetic base drill unit described in the above U.S. patent, rotation of the feed motor is transmitted to the drill unit through a reduction gear during the hole cutting work, while it is transmitted to the drill unit without through the reduction gear after the termination of the hole cutting work.

However, such magnetic base drill unit requires a mechanism for disconnecting the reduction gear connected to the feed motor, so the construction of the magnetic base drill unit becomes complicated and large-sized. In order to dissolve such problem, it is considered that a d.c. motor is utilized as the feed motor, the polarity of the power supply to the motor is made invertible, and its voltage or current value is made variable. That is, by making the voltage applied to the feed motor lower during the hole cutting of the drill unit, while by making it higher after the termination of the hole cutting, the rise speed of the drill unit can be made faster than the fall speed thereof.

The above described technique had the following problem The fall and rise speeds of the drill unit can be altered, as previously stated, however, if the voltage and/or current applied to the feed motor becomes excessively large during the hole cutting (falling of the drill) because of an unexpected factor, the fall speed of the drill unit becomes excessively large, and the annular cutter attached to the arbor assembly of the drill unit may be broken or the drill motor may be burn out.

SUMMARY OF THE INVENTION

The present invention has been made to solve the above described problem, and an object of the present invention resides in provision of a controller for a magnetic base drill unit provided with a safety circuit, which can stop rotation of a feed motor and a drill motor instantly if the voltage/current applied to the feed motor during the hole cutting became excessively large because of a certain cause.

A further object of the present invention lies in provision of a controller for a drill unit, which is further provided with means for confirming the operation of the safety circuit.

The present invention is characterized in that, in order to solve the above described problem, when the application of a voltage/current higher than a predetermined voltage/current of the feed motor in the hole cutting mode to the feed motor is detected during the hole cutting work by the electric drill, the power supply to the drill motor and feed motor is cut. This enables rotations of the feed motor and drill motor to be stopped instantly when the voltage/current applied to the feed motor becomes excessively large because of an unexpected factor during the hole cutting.

Also, the present invention is characterized in that the safety circuit is constructed by connecting in series a relay provided with contacts for cutting the power supply to the drill motor and feed motor, a resistor and a diode, and by connecting them in parallel with the feed motor so that the relay is supplied certain current during the hole cutting. If the resistance value of the resistor is preset to an appropriate value, the relay is actuated when a voltage higher than the predetermined voltage to be applied to the feed motor in the hole cutting mode is applied to the feed motor during the hole cutting, thereby cutting the power supply to the drill and feed motors.

Further, the present invention is also characterized in that the detection of the termination of the hole cutting is performed by detecting that the current value of the drill motor has exceeded once the preset value and has lowered below the preset value after the elapse of a predetermined time. Since the current value of the drill motor increases or decreases depending on the load of the drill motor, it can be determined by the above detection that the load of the drill motor has lightened, or the hole cutting work by automatic feed has terminated. If the current value of the drill motor has lowered below the preset value before a certain preset time has elapsed, it can be determined that it is a test boring by a manual hole cutting.

Since the safety circuit as described before must be operated reliably when the magnetic base drill unit malfunctions, it Is required to test whether or not the safety circuit operates reliably, for instance, before the actual hole cutting work or in the factory for manufacturing the magnetic base drill unit. However, since the magnetic base drill unit is constructed so that only a preset low voltage is applied to the feed motor when the drill unit is in a fall (or advancing) mode, the operation to the safety circuit cannot be confirmed.

Accordingly, the present invention is characterized in that a voltage higher than the maximum predetermined voltage to be applied during the hole cutting can be applied to the feed motor in the fall mode of the electric drill. Thus, the safety circuit can be tested by applying a (test) voltage exceeding a low preset voltage to be applied during the hole cutting to the feed motor in the fall mode of the drill unit.

Also, the present invention is characterized in that, when the test voltage is applied to the feed motor, the output of the means for applying a hole cutting voltage to the feed motor in the usual fall mode of the electric drill is inhibited. As a result, a test voltage applied to the feed motor is not disturbed by the action of the means for applying a voltage for hole cutting, so the application of the test voltage to the feed motor can easily be performed.

Further, the present invention is characterized in that the means for applying a voltage for hole cutting is constructed so that a voltage depending on the value of the current flowing in the drill motor is applied to the feed motor. By this, the number of revolutions of the feed motor becomes smaller when the load of the drill motor is larger, and vice versa.

Moreover, the present invention is also characterized in that the means for applying a voltage for hole cutting is constructed with fixed-current means such as diode so that the current flowing in the feed motor decreases to a preset level when the current flowing in the drill motor is smaller than a certain lower limit value. This will allow the feed rate of the drill unit to decrease when the hole cutting by the drill unit begins.

BRIEF DESCRIPTION OF THE DRAWING

FIG. 14 is a truth table of each logic circuits shown in FIG. 13.

DETAILED DESCRIPTION OF THE PREFERRED EMBODIMENTS

Figure 2:
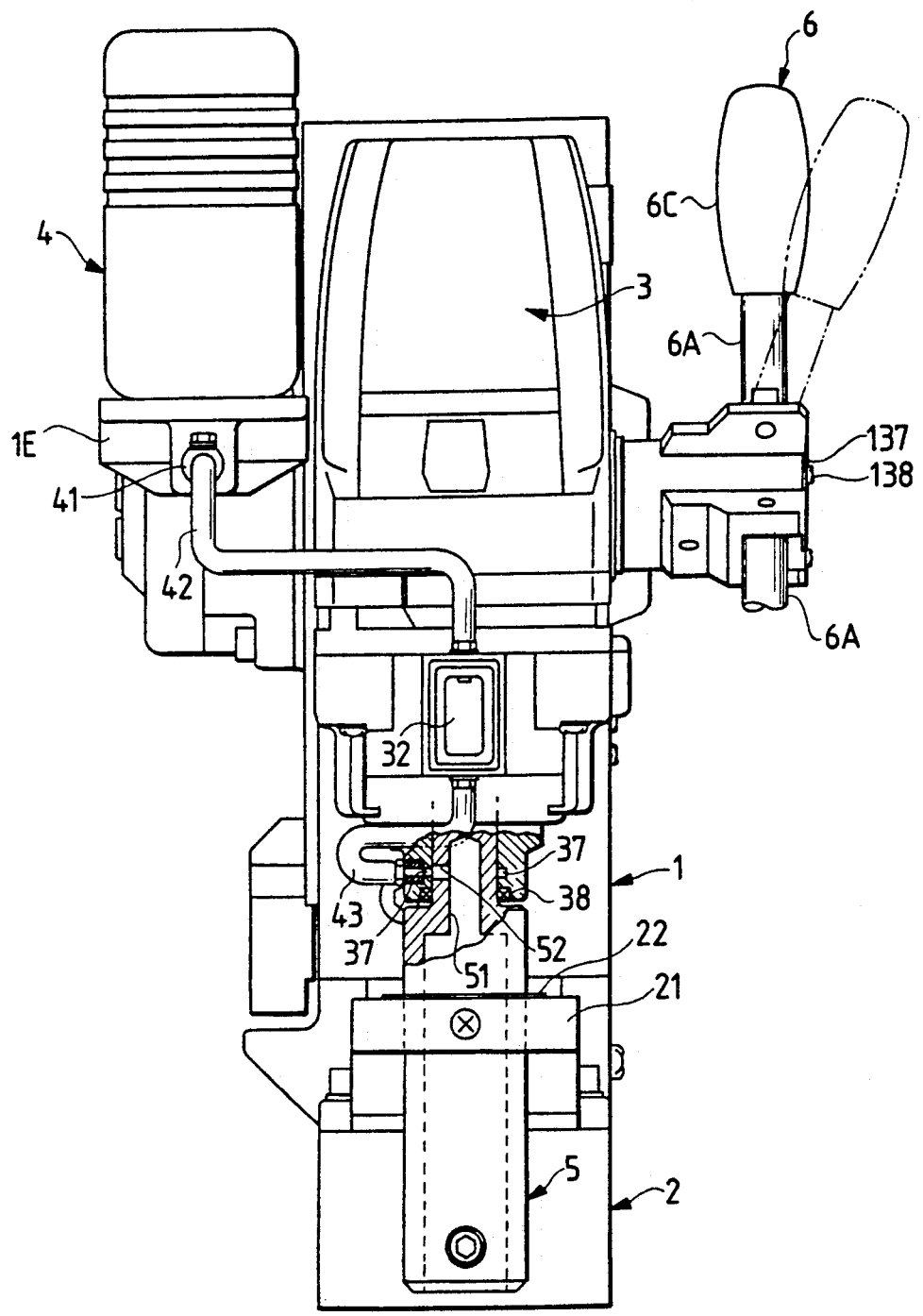
FIG. 2 is a front view showing an example of the magnetic base drill unit to which the present invention is applied, with the annular cutter being omitted.
Figure 3:
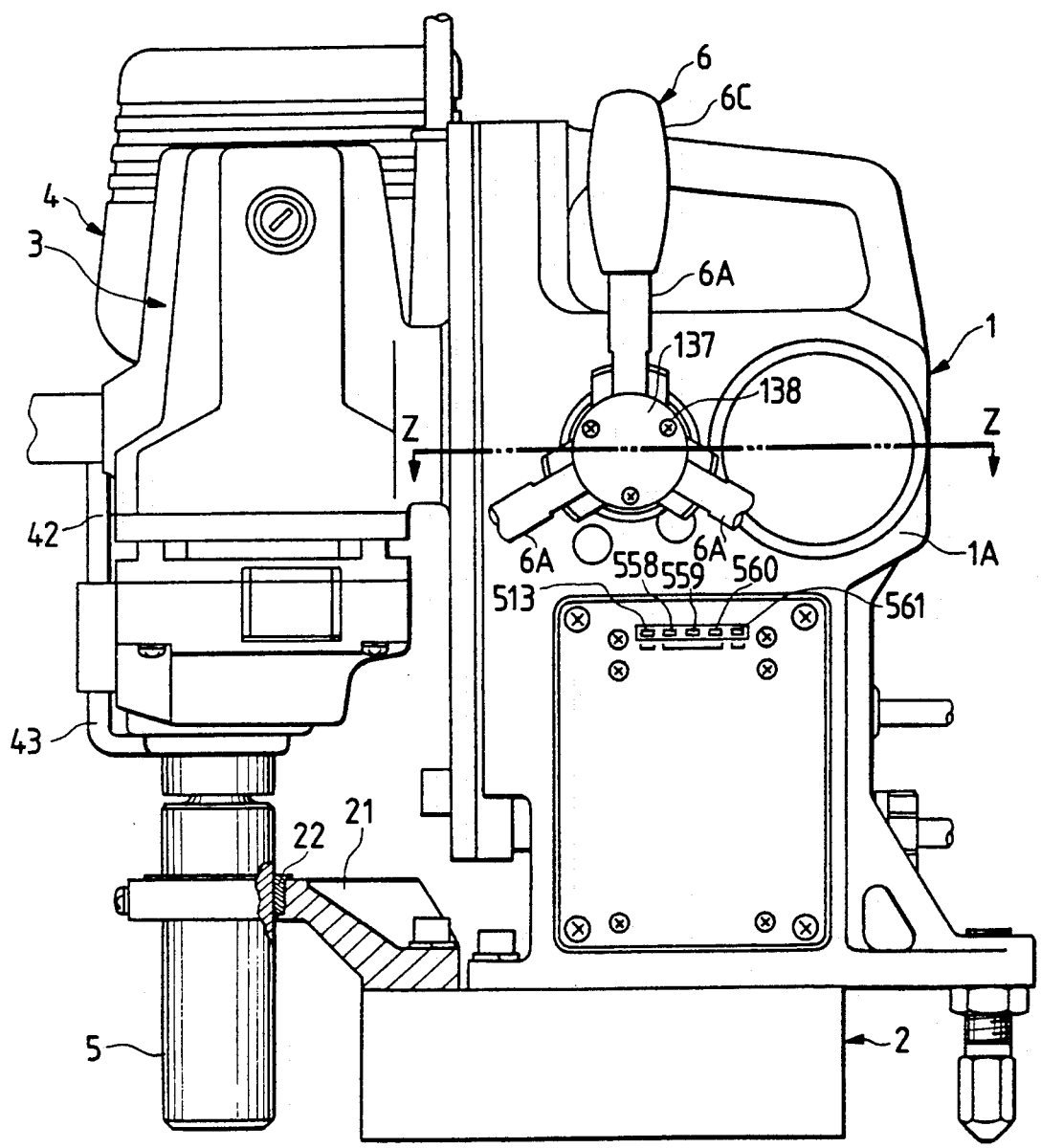
FIG. 3 is a right side view of FIG. 2.
Figure 4:
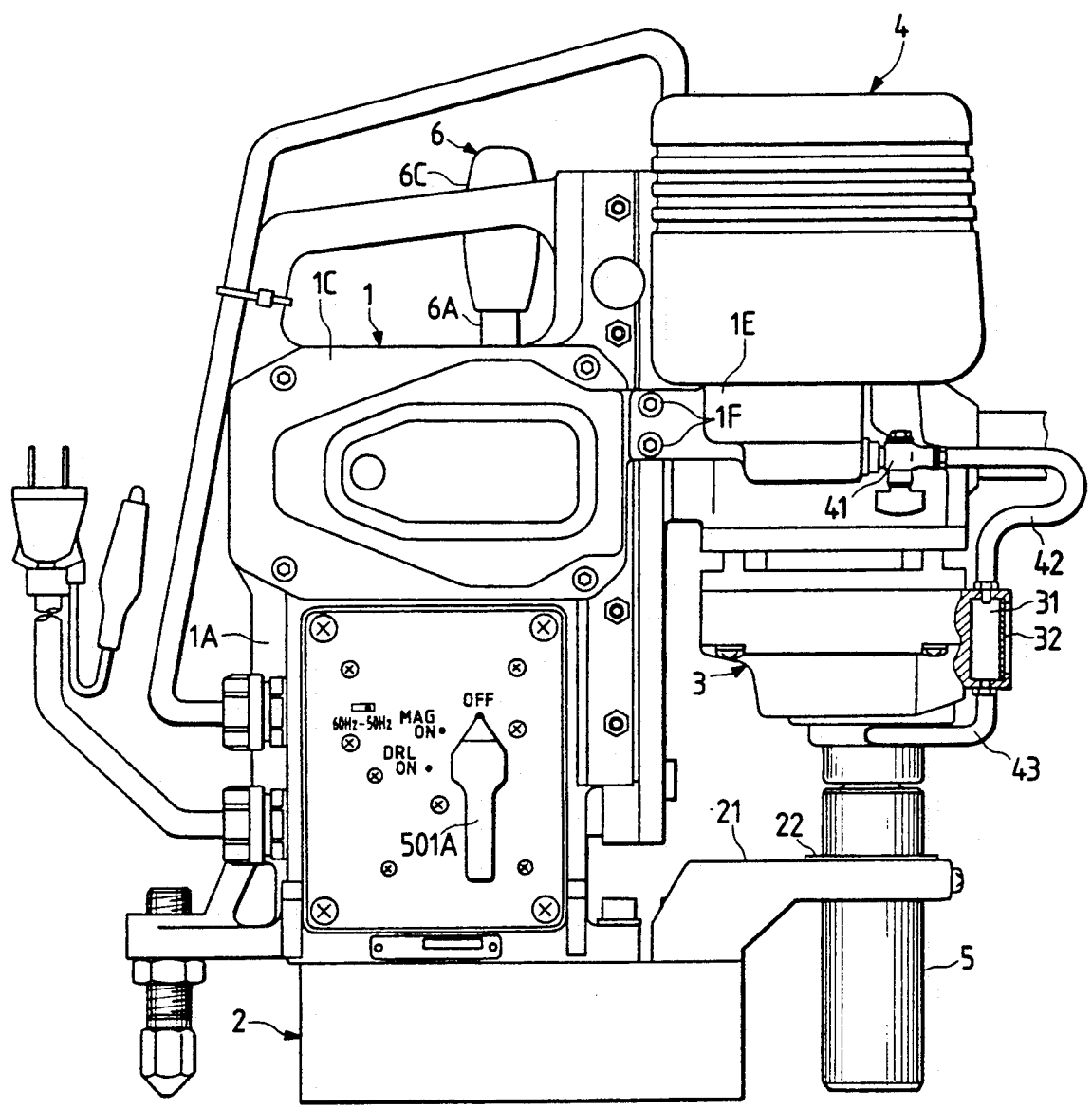
FIG. 4 is a left side view of FIG. 2.

Now, the present invention is described in detail with reference to the drawings. FIG. 2 is a front view of an example of the magnetic base drill unit to which the present invention is applied, FIG. 3 is a right side view of FIG. 2, and FIG. 4 is a left side view of FIG. 2.

In each figure, a magnetic base 2 and a drill unit 3 are attached to a frame 1. The drill unit 3 is moved upwardly and downwardly by the rotation of a feed motor 101, which is described later with reference to FIG. 5. An arbor assembly 5 of the drill unit 3 is molded integrally with the rotating shaft (spindle) of the drill unit 3, supported for rotation by the bush 22 of an arm 21 attached to the magnetic base 2, and has an annular cutter or twist drill (not shown) in its lower end portion.

A bracket 1E is attached to the frame 1 by screw 1F. A cartridge-type oil tank 4 is fixed to the bracket 1E. The cutting lubricant injected into the oil tank 4 is introduced drop by drop through an oil cock 41 and a tube 42 into oil reservoir 31 formed in the body of the drill unit 3. The oil is further introduced through a tube 43 into an annular groove 37 formed in the case of drill unit 3 supporting the arbor assembly 5.

The oil introduced into the annular groove 37 flows out through an oil introducing port 52 bored in an inner wall 51 of the arbor assembly 5 into the inner wall 51, whereby oil supply is made to the annular cutter fixed to the arbor assembly 5. A transparent window 32 forms one wall surface of oil reservoir 31 and which wall is made of glass, resin or the like for monitoring the dropping condition of the oil introduced into the oil reservoir 31, and 38 is an oil seal.

The drill unit 3 is constructed so that is caused to rise and fall by rotation of a rotary handle 6 after a clutch (ball clutch 120) is connected. The clutch 120 will be described later with reference to FIG. 5, 6 and 12. 6A is a shaft, and 6C is a grip.

Figure 5:
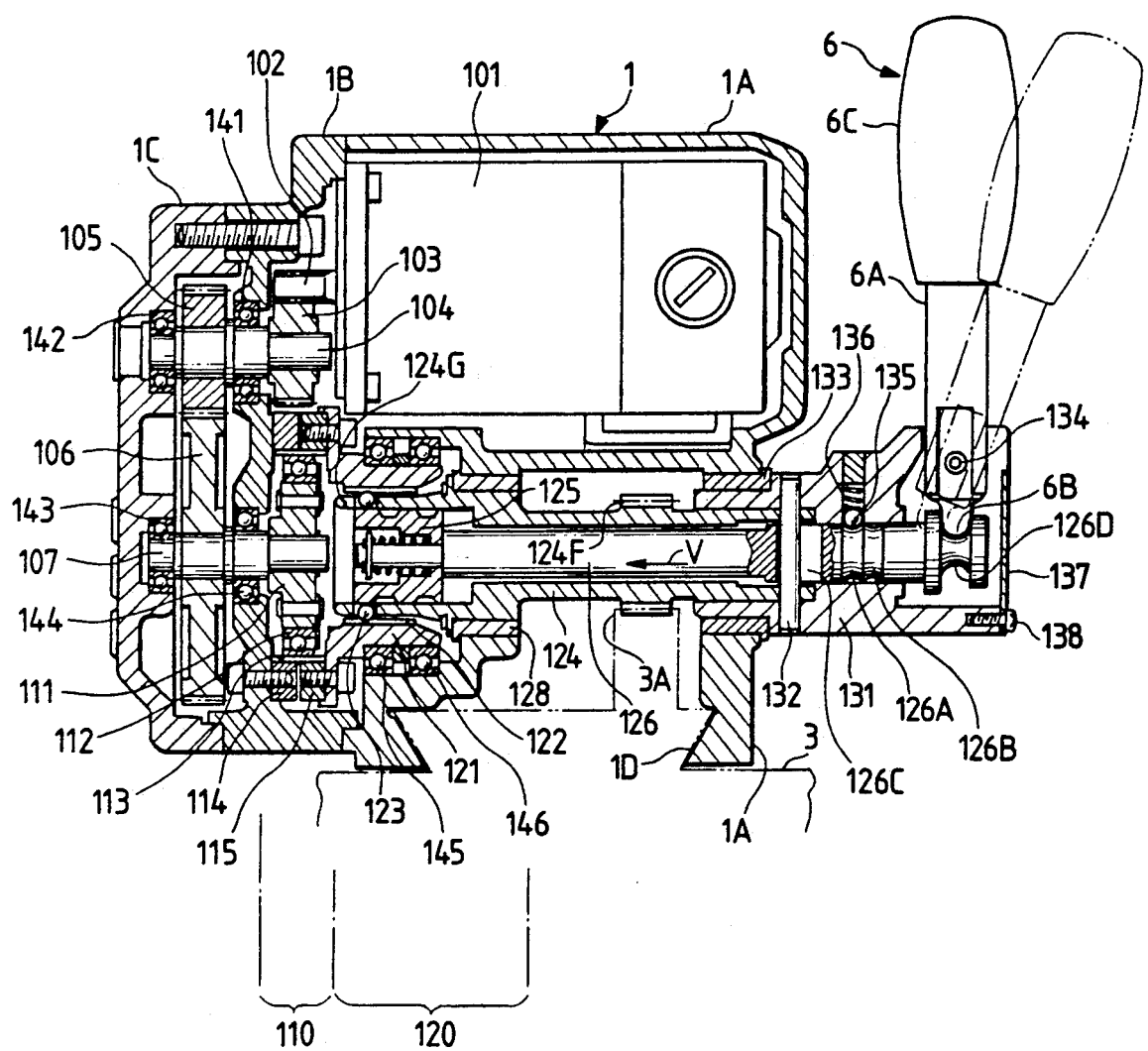
FIG. 5 is a cross-sectional view along Z—Z line of FIG. 3.
Figure 6:
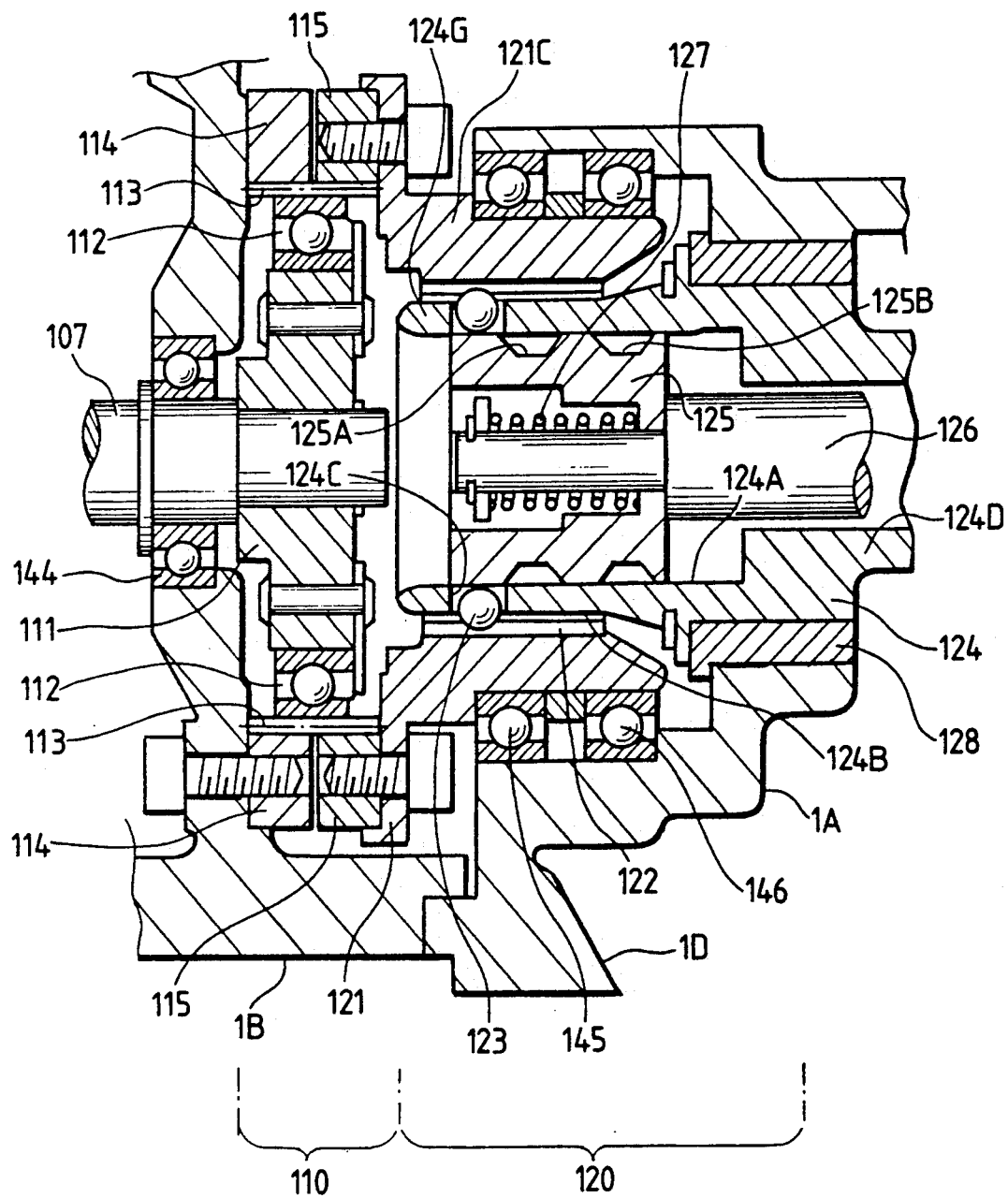
FIG. 6 is an enlarged cross-sectional view of the Harmonic Drive unit and ball clutch of FIG. 5, in which the ball clutch is connected.

FIG. 5 is a cross-sectional view along the Z—Z line of FIG. 3, and FIG. 6 is an enlarged view of "Harmonic Drive" (a registered trademark) 110 and the ball clutch 120 shown in FIG. 5. In each figure, the same symbols as FIGS. 2-4 represent the same or identical portions.

In FIGS. 5 and 6, the rotation of the main shaft of the feed motor 101 fixed to a base 1B of the frame 1 is transmitted via a pinion gear 102 fixed to the output shaft thereof, a spur gear 103, a spur gear 105 fixed to the same shaft 104 as for the spur gear 103, and a spur gear 106 to a shaft 107 fixed to the spur gear 106. A reference numerals 141 and 142 are ball bearings supporting the shaft 104, and 143 and 144 are ball bearings supporting the shaft 107.

110 is the Harmonic Drive as mentioned above, which is a reduction gear made by Harmonic Drive Systems Co., Ltd. The Harmonic Drive 110 comprises a wave generator 111, a wave generator bearings 112, a flexspline 113, a circular spline-S 114 and a circular spline-D 115.

The wave generator 111 is an ellipsoidal plate-like body (an ellipsoid) which is connected to the shaft 107 and has a plurality of wave generator bearings 112 disposed on the outer periphery thereof. The flexspline 113 has a plurality of teeth on the outer periphery thereof and is elastically deformed so that they are closely contacted with the individual wave generator bearings 112. Since the flexspline 113 is in engagement with the circular spline-S 114 and the circular spline-D 115 as described later, the shape of flexspline 113 varies as the ellipsoidal wave generator 111 rotates.

The circular splines-S 114 and -D 115 are ring-shaped members each inner peripheral portion of which is formed into a circle, and each of which has a plurality of teeth engaging with the teeth of the flexsplene 113. The number of the teeth formed in the circular spline-S 114 is larger than that in the flexspline 113, and the number of the teeth formed in the circular spline-D 115 is the same as that of flexspline 113. In addition, the circular spline-S 114 is fixed to the base 1B.

Accordingly, the number of teeth of circular spline-S 114 is larger than that of flexspline 113 by two teeth, for instance, flexspline 113 rotates for two teeth relative to circular spline-S 114 as wave generator ill rotates one revolution. Also, since the number of teeth of the circular spline-D 115 is same as that of flexspline 113, the circular spline-D 115 rotates at the same speed as flexspline 113. That is, the rotation of the shaft 107 is transmitted to circular spline-D 115 with a very high reduction ratio.

Figure 7:
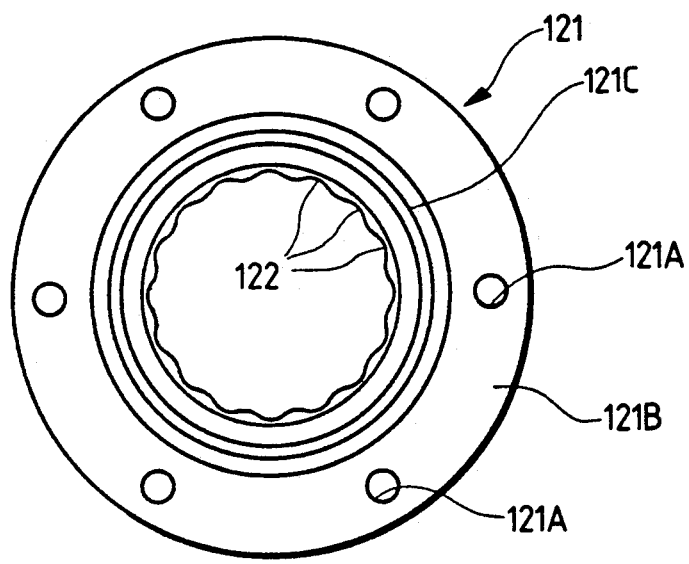
FIG. 7 is a front view of the engagement member 121 of the ball clutch.
Figure 8:
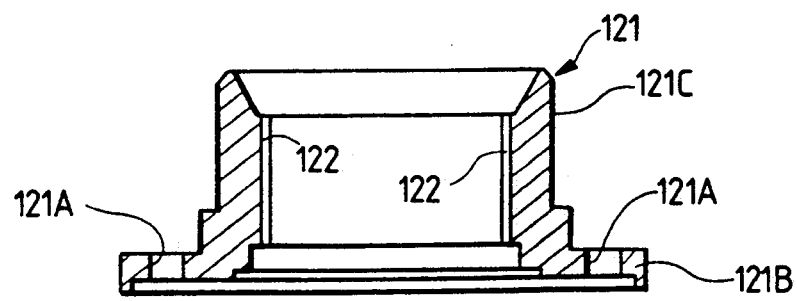
FIG. 8 is a longitudinal sectional view of the engagement member 121 of the ball clutch.

An engagement member 121 of the ball clutch 120 is connected to the circular spline-D 115. The front and longitudinal sectional views of the engagement member 121 are shown in FIGS. 7 and 8.

The engagement member 121 consists of a cylindrical portion 121C and a flange 121B. In the inner wall of the cylindrical portion 121C, a plurality of recessed portions 122 are formed as shown. 121A represent mounting holes for mounting the engagement member 121 on the circular spline-D 115.

The outer wall of the cylindrical portion 121C of the engagement member 121 is supported for rotation by ball bearings 145 and 146 in the main frame body 1A to which the base 1B is fixed. Into the cylindrical portion 121C of the engagement member 121, one end (cylindrical body 124G) of a cylindrical clutch shaft 124 supported for rotation by bush 128 relative to the main frame body 1A is inserted.

Figure 9:
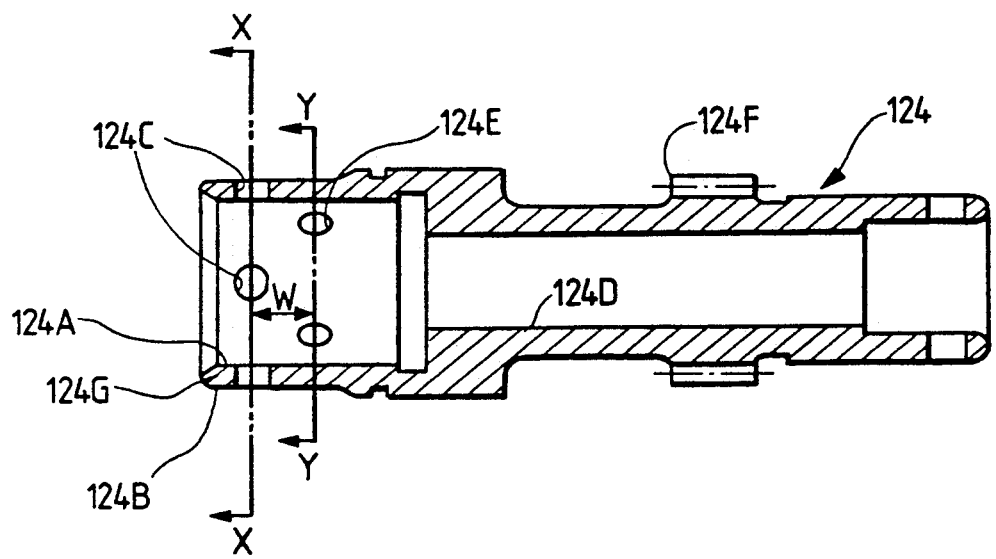
FIG. 9 is a longitudinal sectional view of the clutch shaft 124.
Figure 10:
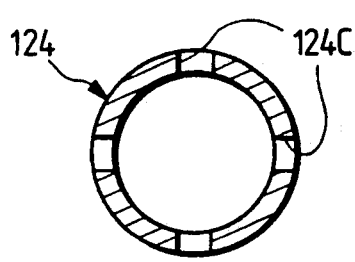
FIG. 10 is a cross-sectional view along X—X line of FIG. 9.
Figure 11:
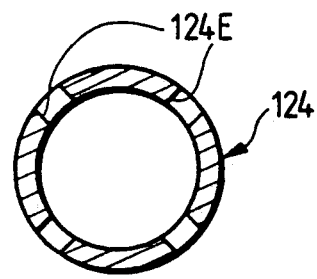
FIG. 11 is a cross-sectional view along Y—Y line of FIG. 9.

FIG. 9 is a longitudinal sectional view of clutch shaft 124, FIG. 10 is an X—X cross-sectional view of FIG. 10, and FIG. 11 is a Y—Y cross-sectional view of FIG. 9. In each figure, in the one end 124G of the clutch shaft 124, four of first hole portions 124C are formed around the clutch shaft 124 at equal intervals (at every 90 in regard to the center axis of the clutch shaft 124) so that they are passing between an inner bore 124A of a relatively large diameter and its outer surface 124B, and four of second hole portions 124E are formed at equal intervals with a distance W from the first hole portions 124C. The first and second hole portions 124C and 124E form an angle of 45 relative to the center axis Of the clutch shaft 124. In FIGS. 5 and 6, the second hole portions 124E are not shown since they are hidden by clutch ring 125 which will be described later.

An inner bore 124D having a diameter smaller than the inner bore 124A is formed in the center portion of the clutch shaft 124.

Returning to FIGS. 5 and 6, an inner shaft 126 having a clutch ring 125 attached to the front end thereof is inserted into the clutch shaft 124 so that the clutch ring 125 is placed within the inner bore 124A of the clutch shaft 124. Around the clutch ring 125, first and second annular grooves 125A and 125B are provided. The distance between the first annular groove 125A and the second annular groove 125B is the same as the distance W between the first hole portions 124C and the second hole portions 124E (FIG. 9). Balls 123 are placed in each of the first and the second hole portions 124C and 124E.

Figure 12:
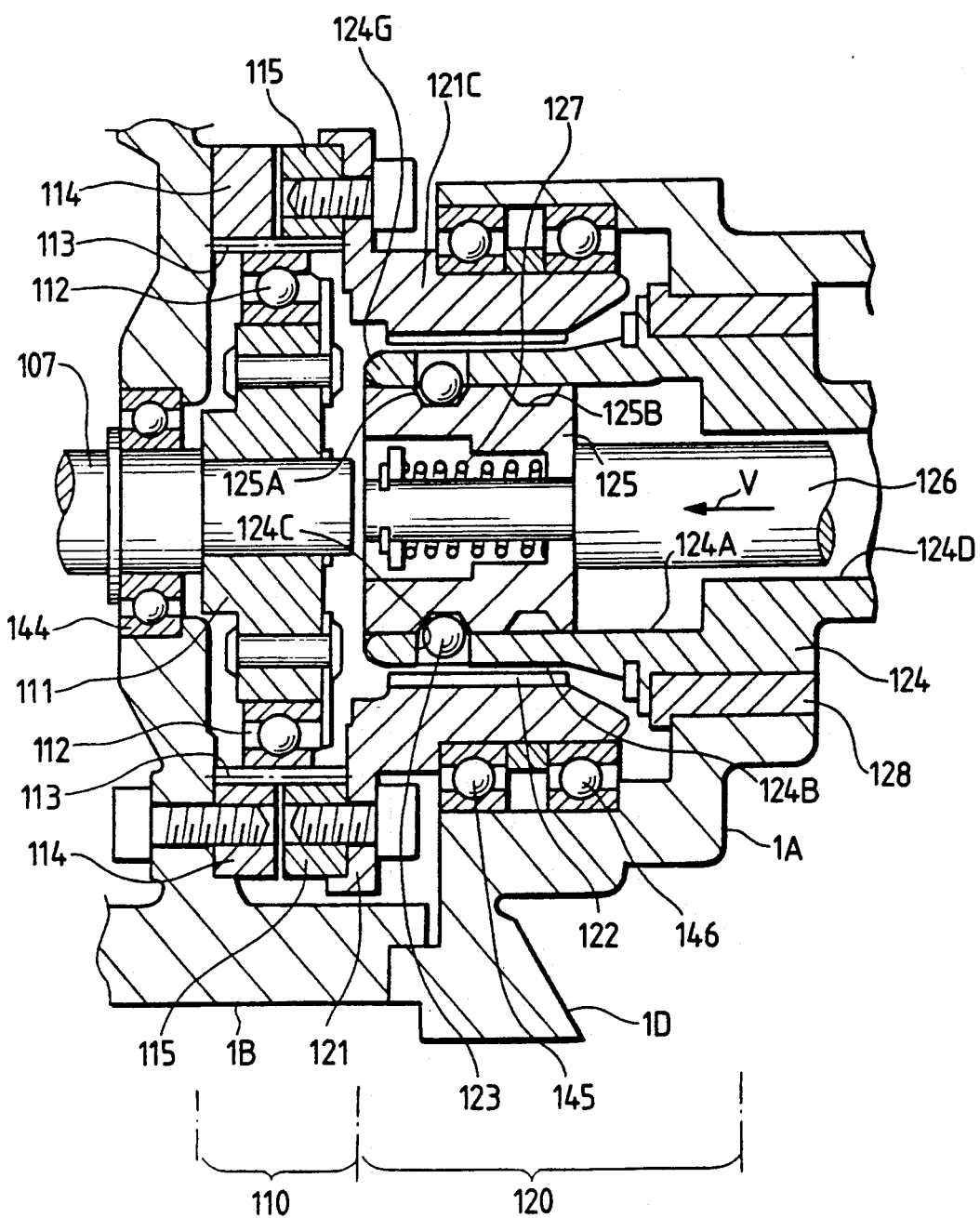
FIG. 12 is an enlarged cross-sectional view of the Harmonic Drive unit and ball clutch of FIG. 5, in which the ball clutch is disconnected.

If the first and the second hole portions 124C and 124E are opposite to the first and second annular grooves 125A and 125B of clutch ring 125, respectively, as shown in FIG. 12, the balls 123 fall in the first and second annular grooves 125A and 125B (hereinafter this condition is referred to as clutch-off). But, if the first and second annular grooves 125A and 125B of the clutch ring 125 are not opposite to the first and the second hole portions 124C and 124E, that is, if the first and the second hole portions 124C and 124E are opposite to the portion of clutch ring 125 having a diameter larger than the first and the second annular grooves 125A and 125B as shown in FIG. 6, the balls 123 are pressed by the larger diameter portion and projects from the outer surface 124B of the clutch shaft 124 to be engaged with recessed portions 122 formed in the cylindrical portion 121C of engagement member 121 (hereinafter this condition is referred to as clutch-on). This allows the rotation of the engagement member 121 to be transmitted to the clutch shaft 124.

Here, in the case that inner shaft 126 is moved (in the direction opposite to that of arrow V of FIG. 12) so that the Clutch condition changes from FIG. 12 to FIG. 6, if the balls 123 do not successfully go into the recessed portions 123, a spring 127 is compressed and only the clutch ring 125 maintains in the state Of FIG. 12. Thereafter, if the clutch shaft 124 is rotated a little, for instance, by the operation of the rotary handle 6, the balls 123 go in the recessed portions 122, and the clutch ring 125 is put in the clutch-on condition shown in FIG. 6 by the repulsive force of the spring 127.

Figure 1:
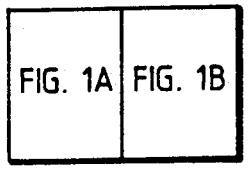
FIG. 1 is a schematic representation showing the organization of FIGS. 1A and 1B which comprise a circuit block diagram of an embodiment of the present invention.
Figure 1A:
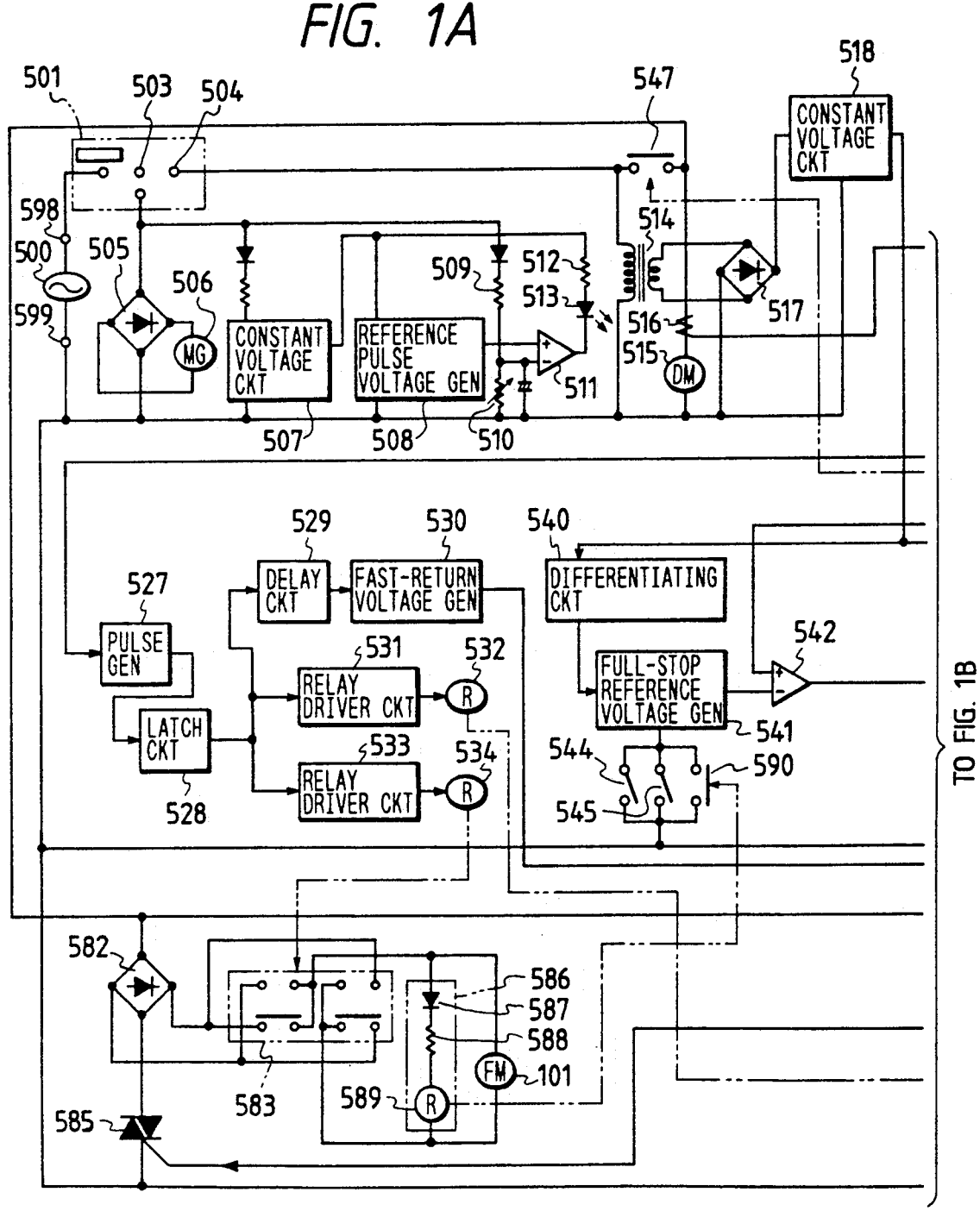
FIG. 1A and 1B together comprise is a circuit block diagram of an embodiment of the present invention.
Figure 1B:
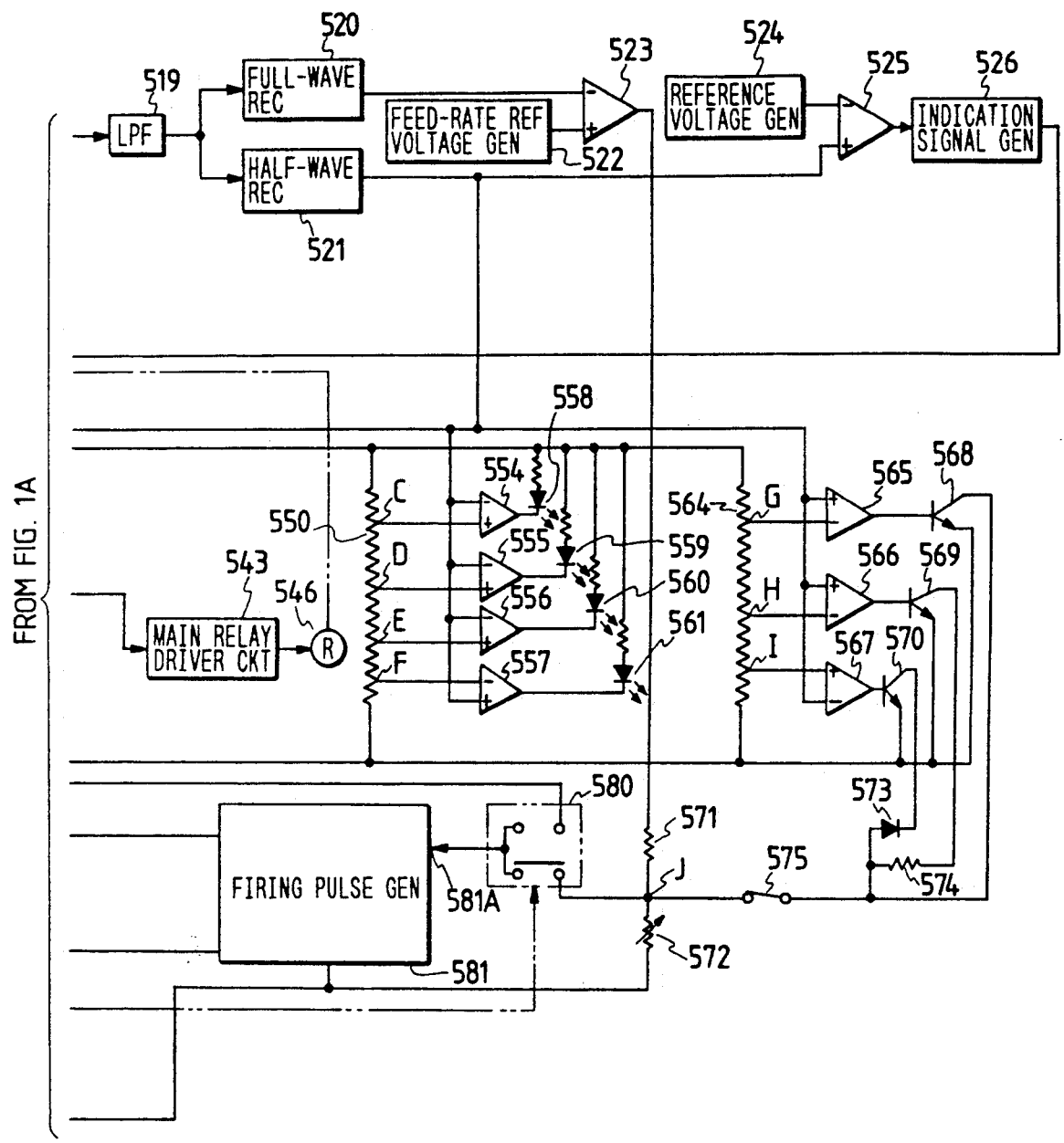

In the present embodiment, if it is assumed that the feed operation of the drill unit 3 in the made of hole cutting is performed by the forward rotation of the feed motor 101 as described later with reference to FIG. 1, the return operation of the drill unit 3 after the termination of the hole outing is performed by the reverse rotation of the feed motor 101, and as a result, the power transmission shaft to which the ball olutch 120 is connected (in this example, circular spline-D 115) is also reversely rotated.

The other end of the clutch shaft 124 is connected to a handle holder member 131 by a pin 132. A long hole 126C is provided in the inner shaft 126 inserted into the clutch shaft 124 so that the axial movement thereof is not prevented by the pin 132. The clutch shaft 124 and the handle holder member 131 connected by the pin 132 constitutes the shaft (rotating shaft) of rotary handle 6. The handle holder member 131 is supported by bush 133 for rotation with respect to the main frame body 1A.

In the inner shaft 126, a first and a second annular grooves 126A and 126B ar formed. A ball 135 is located in the handle holder member 131. The ball 135 is biased to the inner shaft 126 side by a spring 136 to be engaged with one of the first and second annular grooves 126A and 126B.

Specifically, the positions where the first and the second annular grooves 126A and 126B are formed and the position where the ball 135 is placed are predetermined so that the ball 135 engages with the first annular groove 126A if the clutch is connected as shown in FIGS. 5 and 6, while the ball 135 engages with the second annular groove 126B if the inner shaft 126 is moved in the direction of arrow V in FIG. 5 and clutch is disconnected as shown in FIG. 12.

The shaft 6A having grip 6C is provided in the handle holder member 131 so that it freely pivots around the pin 134. As shown in FIG. 3. three shafts 6A are provided in this example.

A projection 6B is formed in the front end of each shaft 6A. The projection 6B is engaged with an annular groove 126D formed in the side of the inner shaft 126 opposite to the side to which the clutch ring 125 is attached. By this engagement, if the shaft 6A is pivoted around the pin 134 so that the grip 6C changes from the state shown by a solid line in FIG. 5 to the state shown by an imaginary line, the inner shaft 126 moves in the direction of the arrow V, the engagement of the ball 135 moves from the first annular groove 126A to the second annular groove 126B, and the clutch is disconnected. Then, if the shaft 6A is returned from the above described state to that of the solid line, the clutch is again connected.

By the selective engagement of the ball 135 with the first annular groove 126A or the second annular groove 126B, the connection/disconnection operation of the clutch is held positively.

In FIGS. 5 and 9, 137 is a blind patch, 138 is a screw for fixing the blind board 137, and 124F is a pinion formed on the clutch shaft 124. The pinion 124F is in engagement with a rack 3A of the drill unit 3 which is slidably attached to a dovetail groove 1D formed in the main frame body 1A. Therefore, if the ball clutch 120 is disconnected and the rotary handle 6 is rotated, the drill unit 3 rises and falls by according to the rotation of the handle 6, and if the ball clutch 120 is connected and the feed motor 101 is energized, the drill unit 3 automatically rises and falls. 1C represents a cover of the frame 1.

Now, the controller of the magnetic base drill unit is described. FIG. 1 is a block diagram of an embodiment of the present invention.

Symbols 598 and 599 are the power supply terminals of the controller of the magnetic base drill unit. A main switch 501 has two contacts, that is, a first contact 503 and a second contact 504, and the first contact 503 is closed by the first-step left rotation operation of a controller 501A (FIG. 4) and the first and the second contact 503 and 504 are closed on by the second-step operation. When the first contact 503 is closed, an electromagnet 506 is excited, and a drill motor 515 and a feed motor 101 rotate when the second contact 504 is closed. The feed motor 101 is a d.c. motor and the drill motor 515 is an a.c. motor.

The pair of input terminals of bridge rectifier 505 are connected to the first contact 503 and the input terminal 509, respectively. The pair of output terminals of the bridge rectifier 505 are connected to the coil of the electromagnet 506 provided within the magnetic base 2. The input terminals of a constant-voltage circuit 507 are connected to the first contact 503 through a diode and a resistor, and the input terminal 599. The output terminal of the constant-voltage circuit 507 is connected to an output terminals of a comparator 511 through a resistor 512 and a light emitting diode 513. A pulse reference voltage generator circuit 508, upon receipt of the output of the constant-voltage circuit 507, periodically outputs a pulse voltage of a predetermined amplitude to the non-inverted input terminal of the comparator 511. A resistor 509 and a variable resistor 510 connected in series are connected between the first contact 503 and the input terminal 599. The node of the resistor 509 and the variable resistor 510 is connected to the inverted input terminal of the comparator 511.

The potential at the inverted input terminal of the comparator 511 is determined by the resistance values of the resistor 509 and the variable resistor 510, and the voltage of a.c. power supply 500. Accordingly, if the resistance values of the resistor 509 and the variable resistor 510, and the output voltage of the pulse reference voltage are preset so that the potential of the inverted input terminal of the comparator 511 is higher than the output voltage of the pulse reference voltage only when the voltage of a.c. power supply 500 is higher than a predetermined voltage, the output of the comparator 511 becomes a low level and the light emitting diode 513 lights regardless of whether or not any pulse is output from the pulse reference voltage, if the output voltage of the a.c. power supply 500 is higher than the predetermined voltage. If the voltage of the a.c. power supply 500 is less than the predetermined voltage, the light emitting diode 518 is extinguished when a pulse is output from the pulse reference voltage generator 508. That is, the light emitting diode 513 blinks.

A pair of input terminals of a transformer 514 are connected to the second contact 504 and the power supply input terminal 599. A drill motor 515 is connected to the second contact 504 and the input terminal 599 through a b-contact 547 of a main relay 546. A CT (current transformer) 516 generates a voltage depending on the current flowing in the drill motor 515. The output terminals of the transformer 514 are connected to a pair of input terminals of a bridge rectifier 517. The output terminal of the rectifier is connected to a constant voltage circuit 518. The output of the CT 516 is supplied to a full-wave rectification circuit 520 and a half-wave rectification circuit 521 through a low-pass filter 519. The voltages output from the full-wave rectification circuit 520 and the half-wave rectification circuit 512 have voltage values depending on the current flowing in the drill motor 515, respectively.

The output signal line of the half-wave rectification circuit 521 is connected to the inverted input terminals of comparators 554, 555 and 556 and to the non-inverted input terminal of a comparator 557. Voltage dividing nodes C, D, E and F of a resistor 550 which is powered by the constant voltage circuit 518, are connected to the non-inverted input terminals of the comparators 554, 555 and 556, respectively, and to the inverted input terminal of the comparator 557. If the potentials of the nodes C, D, E and F are assumed to be c, d, e and f, there is a relationship of equation (1) between these individual potentials.

$$c > d > e > f > 0 \, [V] \tag{1}$$

Light emitting diodes 558–561 are connected to the output lines of the respective comparators 554–557 through corresponding resistors. Accordingly, when the current of the drill motor 515 becomes substantially zero and the output voltage of the half-wave rectification circuit 521 is smaller than the potential f, only the light emitting diode 561 lights. If the load imposed on the drill motor 515 is light, the current value of the drill motor 515 is small, and the output voltage of the half-wave rectification circuit 521 exceeds the potential e and smaller than d, then only the light emitting diode 560 lights. Similarly, if the load is somewhat heavy, the current value of the drill motor 515 is somewhat large, and the output voltage of the half-wave rectification circuit 521 has exceeded the potential d, then the light emitting diode 599 lights as well. If the load is very heavy, the current value of the drill motor 515 is very large, and the output voltage of the half-wave rectification circuit 521 has exceeded the potential c, then the light emitting diode 558 also additionally lights. When the light emitting diode 560 lights, the light emitting diode 561 is extinguished.

That is, the light emitting diode 561 is a stop indicating LED which lights only when the drill motor 515 stops, and the light emitting diodes 558–560 are current level indicating LED's which sequentially light depending on the value of the current flowing in the drill motor 515.

A pair of input terminals of a bridge rectifier 582 are connected to the second contact 504 of the main switch 601 through the b-contact 547 of the main relay 546 and to the input power supply terminal 599 through a triac 585. The triac 585 is controlled by a control signal output from a firing pulse generator circuit 581 which will be described later. The output lines of the bridge rectifier 582 are connected to the feed motor 101 through a pair of contacts 583 of a polarity inversion relay 534. The pair of contacts 583 controls the rotational direction of the feed motor 101 so that the drill unit 3 normally falls down, but it rises up only when the polarity Of the output voltage of the bridge rectifier 582 is reversed.

The firing pulse generator circuit 581 is connected to the input a.c. terminal 599 and the second contact 504 through the b-contact 547. The firing pulse generator circuit 581 controls the triac 585 in response to the potential applied to its control terminal 581A.

The output signal line of the full-wave rectification circuit 520 is connected to the inverted input terminal of a differential circuit 523. An output line of a feed rate reference voltage generator circuit 522 is connected to non-inverted input terminal of the differential circuit 523. The potential output from the feed rate reference voltage generator circuit 522 is preset at a value being larger than the maximum output potential of the full-wave rectification circuit 520. Since the output signal of the differential circuit 523 is a differential signal obtained by subtracting the output signal of the full-wave rectification circuit 520 from the output signal of the feed rate reference voltage generator circuit 522, the output signal of the differential circuit 523 is small if the current value of the drill motor 515 is large, that is, the load of the drill motor 515 is large, and conversely, it is large if the current value of the drill motor 515 is small, that is, the load of the drill motor 515 is small. The output signal line of the differential circuit 523 is connected to the negative output terminal of the constant-voltage circuit 518 through a resistor 571 and a variable resistor 572 which are connected in series. The node J of the resistor 571 and the variable resistor 572 is connected to the control terminal 581A of the firing pulse generator circuit 581 through a contact 580 of a fast return voltage applying relay 532 which will be described later.

Since transistors 568–570 are off during the normal hole cutting work as described later, the firing pulse generator circuit 581 is controlled according to the potential of the output signal of the differential circuit 523. That is, if the load of the drill motor 515 is relatively large, the number of rotations of the feed motor 101 becomes small and the falling speed of the drill unit 3 becomes low, and inversely, if the load of the drill motor 515 is small, the number of rotations of the feed motor 101 becomes large and the falling speed of the drill unit 3 becomes high.

The output signal line of the half-wave rectification circuit 521 is connected to non-inverted input terminals of comparators 666 and 666 and to a inverted input terminal of a comparator 567. The respective voltage dividing nodes G, H and I of a resistor 564 connected between the output line of the constant-voltage circuit 518 and the common line are connected to the inverted input terminals of the comparators 565 and 566 and to the non-inverted input terminal of the comparator 567. If it is supposed that the potentials of the nodes G, H and I are g, h and i, respectively, there is a relationship of equation (2) between these respective potentials.

$$g > h > i > 0 \, [v] \tag{2}$$

The output lines of the individual comparators 565–567 are connected to the based of the transistors 568–570, respectively. The emitters of the respective transistors 568–570 are connected to the negative output terminal of the constant-voltage circuit 518, namely to the common line. The collectors of the transistors 570 and 569 are connected to one terminal of a normally closed testing switch 575 through a diode 573 and a resistor 574, respectively. The collector of the transistor 568 is directly connected to said one terminal of testing switch 575. The other terminal of the testing switch 575 is connected to the node J.

Here, if the load applied on the drill motor 515 is very light and the current value of the drill motor 515 is very small in case, such as before initiation of the hole cutting by the drill, then the output potential of the half-wave rectification circuit 521 is lower than i and the transistor 570 turns on. As the result, the potential of the node J decreases by the forward voltage drop of the diode 573. That is, in the no-load condition after the rotation of the drill has been initiated, and before the hole outting is actually started to a workpiece, the diode 573 functions as a constant-current element and the potential of control terminal 581A goes down, whereby the voltage supplied to the feed motor 101 is reduced and the number of rotations of the feed motor 101 decreases. In other words, the feed rate of the drill unit 3 becomes low (slow start).

If the hole outting is initiated, the load of the drill motor 515 becomes large, and the output potential of the half-wave rectification circuit 521 is higher than i and lower than h, then all of the transistors 568–570 turn off. With this, the potential of the node J is the output voltage of differential circuit 523 divided by the resistor 571 and the variable resistor 572, and as previously stated, if the load of the drill motor 515 is relatively large, the number of rotations of the feed motor 101 is small and the falling speed of the drill unit 3 becomes small, and conversely, if the load of the drill motor 515 is relatively small, the number of rotations of the feed motor 101 is large and the falling speed of the drill unit is relatively large.

If the load of the drill motor 515 becomes large because of a certain factor, for instance, a built-up edge formed in the drill edge, discharge failure of chips or the like, and the output potential of the half-wave rectification circuit 521 becomes higher than h (but lower than g), then the transistor 569 turns on, so the potential of the node J is dropped by the voltage drop across the variable resistor 574. As a result, the number of rotations of the feed motor 101 becomes small, and the falling rate or feed speed of the drill unit 3 is reduced.

If the load of the drill motor 515 becomes further large and the output potential of the half-wave rectification circuit 521 becomes higher than g, then transistor 668 also turns on, and the potential of the node J goes down to the level of the negative output terminal of constant-voltage circuit 518, or zero volt. Therefore, the potential of the control terminal 581A is also zero and triac 585 is deenergized. Namely, the rotation of the teed motor 101 is halted.

The output line of the half-wave rectification circuit 521 is also connected to a non-inverted input terminal of a comparator 526. An output line of a reference voltage generator circuit 524 is connected to the inverted input terminal of the comparator 525. The output voltage of the reference voltage generator circuit 524 is preset at a value which is substantially intermediate between the respective output voltages of the half-wave rectification circuit 521 when the hole cutting by the drill motor 515 is being performed and when it is not being performed.

Thus, if the hole cutting is not being performed by the drill motor 515 and no load is imposed on the drill motor 515, the output voltage of the half-wave rectification circuit 521 is lower than the output voltage of the reference voltage generator circuit 524 and the comparator 525 provides no output. Conversely, if the hole cutting by the drill motor 515 is being performed and a certain load is imposed on the drill motor 515, the output voltage of the half-wave rectification circuit 521 exceeds the output voltage of the reference voltage generator circuit 524 and the comparator 525 provides an output.

An indication voltage generation circuit 526 generates an output (indication voltage) only when the time period from the generation of an output by the comparator 525 to the termination thereof is longer than a preset predetermined time period (for instance, 1-2 seconds). That is, when a trial hole cutting is performed by manually feeding drill unit 3 before performing an automatic hole cutting, the output signal of the comparator 525 is in high level for a short time, but the indication voltage generation circuit 526 generates no output. When the output of the comparator 525 turns on (to initiate the hole cutting) and turns off after continuation thereof during the predetermined time, the indication voltage generation circuit 526 generates an output signal. This output signal generation means that the hole cutting by the automatic feeding has terminated.

In response to the generation of the output signal, a pulse generator circuit 527 generates a pulse which is latched by a latch circuit 528. By the latched signal, a delay circuit 529 and relay driver circuits 531 and 533 are activated.

Figure 13:
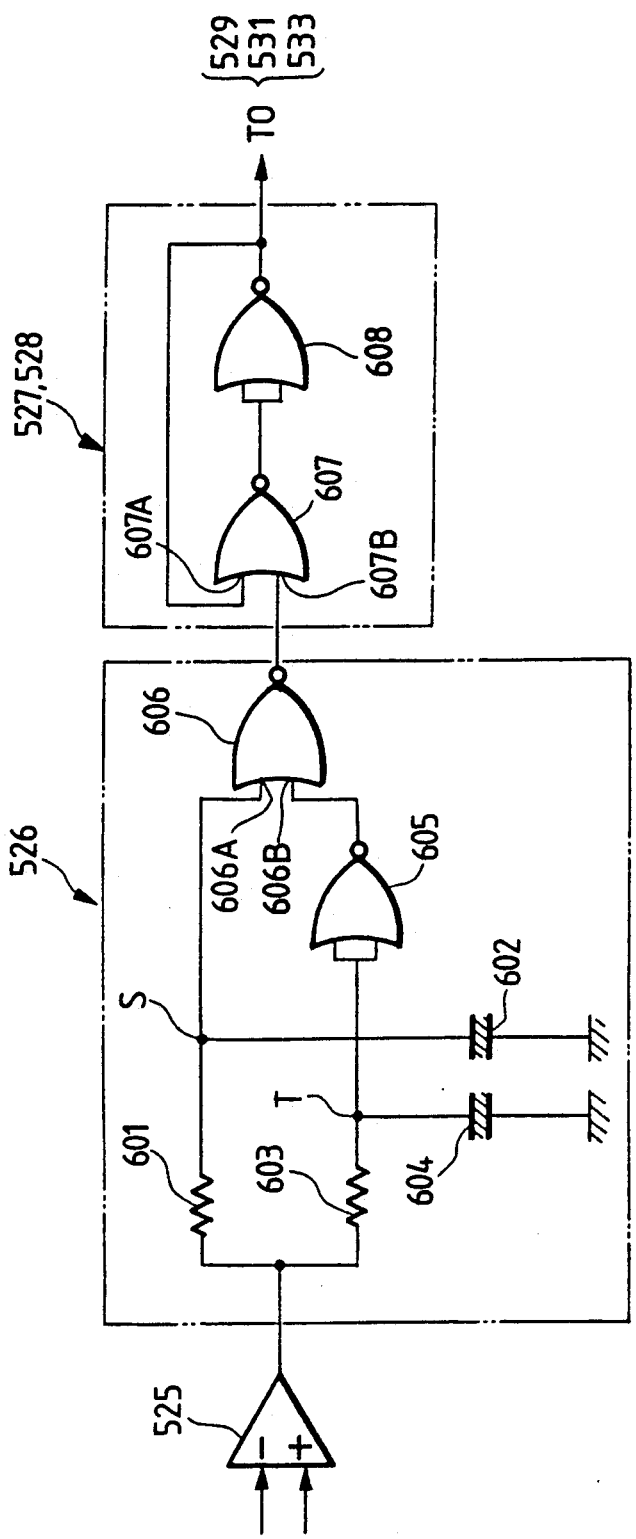
FIG. 13 is a circuit block diagram showing the details of the delay circuit for generating a specified voltage, pulse generator circuit and latch circuit shown in FIG. 1.

FIG. 13 is a block diagram showing the details of the indication voltage generation circuit 526, the pulse generator circuit 527 and the latch circuit 528. In this figure, the same symbols as in FIG. 1 represent the same portions. The output line of the comparator 525 is connected to a pair of input terminals of a NOR circuit 605 through a resistor 603. The output terminal of the NOR circuit 605 is connected to one input terminal 606B of a NOR circuit 606. The output line to the comparator 525 is connected to the other input terminal 606A of the NOR circuit 606 through a resistor 601. The input terminal 606A and the pair of input terminals of the NOR circuit 605 are grounded through capacitors 602 and 604, respectively.

The capacitance values of the capacitors 602 and 604 and the resistance values of the resistors 601 and 603 are respectively determined so that, if the output of the comparator 525 changes from "0" to "1", the "1" signal is first input to the input terminal 606A and thereafter input to the pair of input terminals of the NOR circuit 605 with a delay of a predetermined time (for instance, 1-2 seconds).

The output terminal of the NOR circuit 606 is connected to one input terminal 607B of a NOR circuit 607. The output terminal of the NOR circuit 607 is connected to a pair of input terminals of a NOR circuit 608. The output terminal of the NOR circuit 608 is connected to the other input terminal 607A of the NOR circuit 607, the delay circuit 529, and the relay driver circuits 531 and 533.

Now, the operations of the indication voltage generation delay circuit 526, the pulse generator circuit 527 and the latch circuit 528 are described using a truth table shown in FIG. 14.

First, when the drill motor 515 is not performing the hole cutting, the output of the comparator 525 is "0", and the potentials of nodes S (the input terminal 606A of the NOR circuit 606) and T (the pair of input terminals of the NOR circuit 605) are also "0" as shown by No. 1 (initial condition). Accordingly, the outputs of the NOR circuits 605, 606, 607 and 608 are "1", "0", "1" and "0", respectively. When the drill motor 515 starts the hole cutting, its current value increases, so the output of the comparator 525 changes from "0" to "1" as shown by No. 2. At that time, since the capacitors 602 and 604 have not yet been charged so much, the potentials at the nodes S and T remain to be "0" and the output of each NOR circuit 605-608 remains unchanged.

When the charge in the capacitor 602 has increased with a little delay from the start of the hole cutting, the potential at the node S becomes "1" as shown by No. 3. But the charge in the capacitor 604 is not enough at this time, to reverse the potential at the node T from "0" to "1" and the output of each NOR circuit 605-608 also remains unchanged. When the charge in the capacitor 604 has increased enough with a further delay from the start of the hole cutting, the potential at the node T also becomes "1" as shown by No. 4. Therefore, the Output of the NOR circuit 605 changes from "1" to "0". Since the potential at the node S is "1", the output of the NOR circuit 606 still remains to be "0", and hence the outputs of the NOR circuits 607 and 608 also remain unchanged.

When the hole cutting has completed, the current flowing in the drill motor 515 decreases, so the output of the comparator 525 falls down to "0" again as shown by No. 5. Since discharging of the capacitors 602 and 604 has not yet been enough at this time, the potentials at the nodes S and T and the outputs of the NOR circuits 605-608 are unchanged (namely, same as No. 4). When discharging of the capacitor 602 has done enough with a little delay from the completion of the hole cutting, the potential at the node S becomes "0" as shown by No. 6. Since discharging of the capacitor 604 has not been enough at this time, the potential at the node T is still "1" (that is, the output of the NOR circuit 605 is "0"). Accordingly, the output of the NOR circuit 606 is "1", and the outputs of the NOR circuits 607 and 608 are "0" and "1", respectively. That is, a control signal indicating the oompletion of the hole cutting is output to the delay circuit 529 and the relay driver circuits 531 and 533.

After that, the capacitor 604 is discharged enough, so the potential at the node T also becomes "0" and the outputs of the NOR circuits 605 and 606 are reversed as shown by No. 7. However, the output of the NOR circuit 607 is still unchanged, so the output of the NOR circuit 608 does not change. That is, the output of the control signal indicating the completion of the hole cutting is latched.

Right after the state shown by No. 3, that is, before the capacitor 604 has not been charged enough, if the hole cutting has terminated (for instance, a manual trial boring has terminated), the potentials at the nodes S and T are unchanged as shown by No. 8, and thereafter, even when the discharge of capacitor 602 has been completed, only the potential at the node S is reversed as shown by No. 9 and there is no change in the outputs of the NOR circuits 605-608. That is, no control signal is output indicating the completion of the hole cutting.

Although the capacitor 602 is not necessarily provided, the capacitor 602 serves to make sure that a control signal indicating the completion of the hole cutting is output with a little time lag after the value of the current flowing in the drill motor 515 has become small. Swarfs may remain in the underside of the workpiece just after the completion of the hole cutting, and the output of the control signal with a time lag causes the rise of the drill unit 3 to delay, and as a result, the remaining of the swarfs can be almost prevented.

Returning to FIG. 1, the delay circuit 529 activates a fast-return voltage generator circuit 530 with a predefined time delay. With this activation, the fast-return voltage generator circuit 530 outputs a relatively high voltage signal so that the drill unit 3 rises at a speed higher than the feed rate when the drill unit 3 falls. The relay driver circuits 531 and 533 energize the fast-return voltage applying relay 532 and the polarity reversing relay 534, respectively, to switch the contact 580, whereby the output signal line of the fast-return voltage generator circuit 530 is connected to the control terminal 581A, and as well to switch the contact 583, whereby the polarity of the output voltage of the bridge rectifier 582 supplied to the feed motor 101 is reversed.

Thus, the feed motor 101 starts to rotate reversely at a high speed after the predetermined time has elapsed since the generation of an output by the indication voltage generation circuit 526, and the drill unit 3 rises at a high speed.

The output signal line of the half-wave rectification circuit 521 is further connected to a non-inverted input terminal of a comparator 542. The output signal line of the constant-voltage circuit 518 is connected to a differentiating circuit 540. The differentiating circuit 540 differentiates the output signal of the constant-voltage circuit 518. An output of a full-stop reference voltage generator circuit 541 is rised up if the differential output signal exceeds a predetermined value. If the differential signal is lower than the predetermined value, the full-stop reference voltage is restored to a normal value. The full-stop reference voltage is supplied to the inverted input terminal of the comparator 542.

The output signal of the half-wave rectification circuit 521 momentarily becomes large when the drill motor 515 starts to rotate due to a large starting rush current. But in this case, in response to the output of the differentiating circuit 540, the output voltage of the full-stop reference voltage generator circuit 541 becomes higher than the output voltage of the half-wave rectification circuit 521 and thereby the comparator 542 generates no output, so the main relay 546 is never activated.

When the rush current is extinct, the output of the differentiating circuit 540 lowers and the full-stop reference voltage also reduces, but, on the other hand, the current value of the drill motor 515 has also reduced, so the output voltage of the full-stop reference voltage generator circuit 541 is still maintained higher than the output voltage of the half-wave rectification circuit 521. Therefore, the comparator 542 generates no output.

However, if a large load is applied to the drill motor 515 during the normal operation thereof, due to an unexpected cause, the output voltage of the half-wave rectification circuit 521 exceeds the output voltage of the full-stop reference voltage generator circuit 541, thereby the comparator 542 generates an output. A main relay driver circuit 543 is enabled by the output of the comparator 542, the main relay 546 is energized and its b-contact 547 is opened. Accordingly, the rotations of the drill motor 515 and the fee motor 101 stop. The operation of the main relay 546 is maintained till the power supply to the main relay driver circuit 543 is cut. The power supply to the main relay driver circuit 543 is continued till at least the second contact 504 of the contacts of the main switch 501 is opened.

The full-stop reference voltage generator circuit 541 is connected to the negative output terminal of the constant-voltage circuit 518 through an a-contact 590 of a relay 589, an upper-end detection switch 544 and a shift detection r. switch 545 which are connected in parallel with each other. The upper-end detection switch 544 is constructed so that it is turned on when the drill unit 3 rises to the top end position, and otherwise turned off. The shift detection switch 545 is constructed so that it is at least momentarily turned on, when the electromagnet of the magnetic base drill unit shifts from or on the workpiece.

If the a-contact 590, the upper-end detection switch 544 or the shift detection switch 545 is turned on, the reference voltage generated from full-stop reference voltage generator circuit 541 is lowered to 0 volt, and the main relay 546 is energized regardless of the output voltage of the half-wave rectification circuit 521.

The upper-end detection switch 544 is turned on when the drill unit 3 rises to the top end position thereof after the completion of the hole cutting as described above, but since the operator of the magnetic base drill unit performs the falling operation of the drill unit 3 to perform the positioning of the drill for the next hole cutting, the upper-detection switch 544 is turned off and a predetermined potential is applied to the inverted input terminal of comparator 542. Accordingly, the next hole cutting is enabled.

The shift detection switch 545 may consist of a cylindrical body, mercury sealed in the cylindrical body, and a pair of contacts constructed so as to project into the cylindrical body. If the switch thus constructed is mounted on the magnetic base drill unit with the cylindrical body being inclined so that the pair of contacts are placed in a somewhat upper position, the contacts are normally off, and the mercury moves within the cylindrical body to allow the contacts and turn on at least for a short time if a strong vibration is applied to the magnetic base drill unit. Alternatively, the shift detection switch 545 may be comprised of a fixed contact, and a movable contact which is positioned closely to the fixed contact by some spring means. Also in the switch having this construction, the fixed contact and the movable contact turn on at least for a short time if a strong vibration is applied to the magnetic base drill unit.

A safety circuit 586 is constructed by connecting a diode 587, a resistor 588 and a relay 589 in series, which are connected in parallel with the feed motor 101. The polarity of the diode 587 is selected so that it is conductive when the feed motor 101 is rotating in the direction to cause the drill unit 3 fall. The resistance value of the resistor 588 is set so that, when the feed 101 motor 101 is rotating in the direction to cause the drill unit 3 fall, a sufficient current flows therein to operate the relay 589 if substantially the same voltage as the output voltage of the fast-return voltage generator circuit 530 has been applied across both terminals of the feed motor 101.

If the control device of the magnetic base drill unit is normal, the high voltage output from fast-return voltage generator circuit 530 is applied to the feed motor 101 only when the drill unit 3 is in the rise mode. When a voltage higher than the above-mentioned voltage has been applied to the feed motor 101 in the fall made of the drill unit 3 because of some failure of the controller, the relay 589 is energized to close the a-contact 590. By this, the reference voltage output from the full-stop reference voltage generator circuit 541 goes down to 0 volt, the main relay 546 operates, and both of the drill motor 515 and the feed motor 101 is stopped. Of course, it may be constructed so that the contact 547 or Its equivalent is directly opened in response to the activation of the relay 589.

In order to confirm whether or not the safety circuit 586 functions normally, it is only needed to close the second contact 504 of the main switch 501, open the testing switch 575, and adjust the variable resistor 572 to increase its resistance value or adding a resistor in series therewith, thereby increasing the potential of the node J so that it is substantially the same as the output fast-return e voltage. As the result, the voltage to be applied to the feed motor 101 after the termination of the hole cutting is applied even if the drill motor is falling. That is, the testing voltage is applied to the feed motor 101 for judging whether or not the safety circuit 586 functions normally. The reason why the testing switch 575 is opened is that, when the drill motor 515 is not performing the hole cutting, since the output voltage of the half-wave rectification circuit 512 may be lower than the potential of the voltage dividing point I, and the diode 573 may be conductive, the potential of the node J cannot be increased even if the resistance value of variable resister 572 is increased.

When the operation of the safety circuit 586 has been confirmed, after opening the second contact 504, the testing switch 575 is closed again and the resistance value of the variable resistor 572 is restored.

In addition, if the controller does not include the comparator 567, the transistor 570 and the diode 573, the potential at the node J can be increased only by increasing the resistance value between the node J and the common return line even though the testing switch 575 is kept closed or it is not provided.

ADVANTAGES OF THE PRESENT INVENTION

As apparent from the above description, the following technical effects are accomplished by the present invention.

(1) Since the rotations of the feed motor and drill motor are stopped immediately if the voltage applied to the feed motor in the hole outting mode becomes excessively large, there will be no fear that the cutter attached to the arbor assembly is broken or the drill motor is burnt out.

(2) The safety circuit can consist only of the relays, diodes and resistors. It means that the safety circuit can be comprised of a relatively simple and cheap construction.

(3) The termination of the hole cutting by automatic feeding can be determined reliably. Since this allows the drill unit to immediately rise after the termination of the hole cutting regardless of the thickness of the workpiece, the hole cutting can be performed efficiently as compared with the prior art example in which the rise of the drill unit is performed by detecting the lowest position of the drill unit with a limit switch.

(4) Even in the fall mode of the drill unit, the test voltage exceeding the voltage to be applied during the hole outting can be applied to the feed motor, and in addition there is no fear that the test voltage applied drops, so the test voltage can easily be applied to the safety circuit and the safety test therefor can be reliably performed.

(5) When the load of the drill motor is large, the rotation speed of the feed motor slows down and the feed rate of the drill unit becomes small. Conversely, when the load of the drill motor is small, the rotation speed of the feed motor is increased and the feed rate of the drill unit becomes large. That is, since the feeding of the drill unit is always maintained at an optimum speed depending on the load of the drill motor, the automatic hole cutting work can be performed efficiently.

(6) Since the rotation speed of the feed motor is decreased and the drill unit falls slowly to the workpiece when the automatic hole cutting work by the magnetic base drill unit is initiated, that is, till the drill is brought in contact with the workpiece, the hole cutting can be performed stably and reliably even at the start of the hole outting at which the hole outting is generally believed unstable.

(7) Since the function for decreasing the rotation speed of the feed motor as described in the above item (6) can be accomplished only by a diode, the construction of the controller can be simplified.

What is claimed is:

1. A controller for a magnetic base drill unit comprising a frame having a magnetic base which magnetically adheres to a workpiece, an electric drill having a drill motor, and a feed motor fixed to the frame for causing the electric drill to advance upon and recede from the workpiece, the controller comprises:

hole cutting termination detection means for detecting the termination of the hole cutting in the workpiece by the electric drill, feed motor reversing means responsive to the output of the hole cutting termination detection means for reversing the rotational direction of the feed motor, and for applying to the feed motor a voltage which is higher than the voltage applied to the feed motor during the advancing mode of the electric drill, and safety circuit means for detecting that a voltage higher than a predetermined voltage to be applied to the feed motor in the advancing mode of the electric drill is applied to the feed motor during the advancing mode, and for stopping the supply of power to the drill motor and the feed motor.

2. The controller for a magnetic base drill unit as set forth in claim 1 wherein the safety circuit means comprises a relay for cutting the power supply to the drill motor and the feed motor, a resistor and a diode which are connected in series each other, and they are connected in parallel with the feed motor so that the relay is powered during a hole cutting operation.

3. The controller for a magnetic base drill unit as set forth in claim 1 wherein the hole cutting termination detection means generates an output when the current value of the drill motor exceeds a predetermined first threshold value and falls below the first threshold value after the elapse of a predetermined time.

4. The controller for a magnetic base drill unit as set forth in claim 1 wherein the feed motor is a d.c. motor, and the feed motor reversing means responses to the hole cutting termination detection output to reverse the polarity of the d.c. voltage applied to the feed motor.

5. A controller for a magnetic base drill unit comprising a frame having a magnetic base which magnetically adheres to a workpiece, an electric drill having a drill motor, and a feed motor fixed to the frame for causing the electric drill to advance upon and recede from the workpiece, the controller comprises:

hole cutting termination detection means for detecting the termination of the hole outting in the workpiece by the electric drill, driving voltage generator means for generating a voltage to be applied to the feed motor, means for supplying to the driving voltage generator means a first signal for causing the driving voltage generator means to generate a predetermined voltage suitable for the electric drill in the advancing mode, feed motor reversing means responsive to the output of the hole outting termination detection means for reversing the rotational direction of the feed motor to switch the electric drill to the receding mode.

safety circuit means for monitoring the voltage applied to the feed motor by the driving voltage generator means during the advancing mode of the electric drill, and cutting the power supply to the drill motor and the feed motor when the applied voltage has exceeded a preset upper-limit value, and safety circuit test voltage generator means for supplying to the driving voltage generator means for the feed motor a second signal for causing the driving voltage generator means to generate a testing voltage exceeding the upper-limit voltage during the advancing mode of the electric drill.

6. The controller for a magnetic base drill unit as set forth in claim 5 wherein the first signal supplied to the driving voltage generator means is a function of the load on the drill motor.

7. The controller for a magnetic base drill unit as set forth in claim 5 wherein the first signal supplied to the driving voltage generator means is to lower the voltage generated by the driving voltage generator means to a predetermined level when the load of the drill motor is lighter than a predetermined second threshold value.

8. The controller for a magnetic base drill unit as set forth in claim 5 wherein the supply of the first signal to the driving voltage generator means is inhibited when the second signal is supplied to the driving voltage generator means.

9. The controller for a magnetic base drill unit as set forth in claim 5 wherein the feed motor is a d.c. motor, and the feed motor reversing means reverses the polarity of the d.c. voltage applied to the feed motor in response to the hole cutting termination detection output.

10. A controller for a magnetic base drill unit comprising a frame having a magnetic base which magnetically adheres to a workpiece, an electric drill having a drill motor, and a feed motor fixed to the frame for causing the electric drill to advance upon and recede from the workpiece, the controller comprises:

reference voltage signal generator means for generating a reference voltage signal, comparator means for comparing the reference voltage signal with the voltage of power supplied at least to the magnetic base, and for generating an output in response to the comparison result when the power supply voltage is lower than the reference voltage signal output, and warning means for giving a warning in response to the output of the comparator means.

11. The controller for a magnetic base drill unit as set forth in claim 10 wherein the warning means is a light emitting diode.

12. The controller for a magnetic base drill unit as set forth in claim 10 wherein the reference voltage signal generator means is means for generating a pulse-like constant voltage signal.

13. The controller for a magnetic base drill unit as set forth in claim 10 wherein the comparator means activates the warning means when the power supply voltage is lower than the constant voltage signal output by the constant voltage signal generator means.

* * * * *